(12) United States Patent
Ohkubo et al.

(10) Patent No.: US 7,207,234 B2
(45) Date of Patent: Apr. 24, 2007

(54) BALL SCREW

(75) Inventors: Tsutomu Ohkubo, Gunma (JP); Kouji Takino, Gunma (JP)

(73) Assignee: NSK Ltd., Tokyo (JP)

( * ) Notice: Subject to any disclaimer, the term of this patent is extended or adjusted under 35 U.S.C. 154(b) by 251 days.

(21) Appl. No.: 10/389,906

(22) Filed: Mar. 18, 2003

(65) Prior Publication Data

US 2003/0221501 A1 Dec. 4, 2003

(30) Foreign Application Priority Data

Mar. 18, 2002 (JP) ............................. P2002-075058

(51) Int. Cl.
*F16H 1/24* (2006.01)

(52) U.S. Cl. ............................. 74/424.83; 74/424.86; 74/424.88

(58) Field of Classification Search ............. 74/424.88, 74/424.81, 424.82, 424.87, 424.86, 424.83; 384/51

See application file for complete search history.

(56) References Cited

U.S. PATENT DOCUMENTS

| 3,220,785 A * | 11/1965 | Noll et al. .................. 384/604 |
| 4,175,805 A * | 11/1979 | Becker et al. ............... 385/520 |
| 5,927,858 A * | 7/1999 | Agari .......................... 384/45 |
| 6,082,210 A * | 7/2000 | Ise ............................. 74/424.83 |
| 6,149,307 A * | 11/2000 | Kamimura et al. ........... 384/49 |
| 6,247,846 B1 * | 6/2001 | Shirai ......................... 384/45 |
| 6,415,676 B1 * | 7/2002 | Takagi et al. ............. 74/424.88 |
| 6,513,978 B2 * | 2/2003 | Shirai et al. ................. 384/45 |
| 6,644,140 B2 * | 11/2003 | Akido ....................... 74/424.88 |
| 6,709,158 B2 * | 3/2004 | Ishihara ....................... 384/44 |
| 6,736,235 B2 * | 5/2004 | Yoshida et al. ............. 180/444 |
| 6,779,419 B2 * | 8/2004 | Yamaguchi ................ 74/424.88 |
| 2002/0104398 A1 * | 8/2002 | Pawlak ..................... 74/424.75 |
| 2002/0139209 A1 * | 10/2002 | Takagi et al. ............. 74/424.82 |

FOREIGN PATENT DOCUMENTS

DE     100 22 715 A1     12/2000
DE     101 10 220 A1     9/2001

* cited by examiner

*Primary Examiner*—David M. Fenstermacher
(74) *Attorney, Agent, or Firm*—Sughrue Mion, PLLC (57) ABSTRACT

In a ball screw, a nut is fitted with the outer periphery of a screw shaft, ball rolling grooves opposed to each other are formed in the screw shaft and the nut The ball rolling grooves cooperate in forming a ball rolling path therebetween. A tube as a return path disposed on the nut for connecting one end portion of the ball rolling path to the other end portion thereof, the ball rolling path and tube cooperate in forming an endless circulation path. A plurality of load balls are disposed within the endless circulation path. The position of the tube cannot be limited to a single specific position. In the ball screw, retaining pieces are respectively inserted between the mutually adjacent ones of the load balls disposed within the endless circulation path.

5 Claims, 6 Drawing Sheets

PRIOR ART

BALL SCREW

BACKGROUND OF THE INVENTION

1. Field of the Invention

The present invention relates to a ball screw using for a feed mechanism disposed in various machines.

2. Description of the Related Art

In a ball screw of this type, a nut is fitted with an outer periphery of a screw shaft. Helical ball rolling grooves are formed in an outer peripheral surface of the screw shaft and the inner peripheral surface of the nut. The mutually opposed ball rolling grooves cooperate together in forming a ball rolling path between the ball rolling grooves.

A return path is formed in the nut. The return path connects together one end portion of the ball rolling path and the other end portion thereof.

Both ball rolling path and return path cooperate together to form an endless circulation path. A plurality of load balls are mounted within the endless circulation path in such a manner that they are adjacently arranged one another. Accordingly, the screw shaft and nut are allowed to make smooth helical motion with respect to each other through the rolling motion of the load balls, which are in the ball rolling path.

That is, in accordance with the relative helical motion between the screw shaft and the nut, the load balls circulate endlessly while they are rolling in the endless circulation path when the load balls roll along a part of the ball rolling path, which is formed by the ball rolling grooves, loads for power transmission are applied to the load balls.

The return path, which connects together the two end portions of the ball rolling path formed by the ball rolling grooves, is formed of e.g. a metal-made tube This tube is disposed on the nut in such a manner that a portion thereof is exposed to the outer peripheral portion of the nut.

The position of the tube disposed on the nut (the position of the tube with the center axis of the nut as the standard) changes variously according to both setting state of the ball screw and an operation of the nut. The position of the tube can have an influence on a dynamic torque characteristic of the ball screw in connection with gravitation.

A large number of load balls with a mounting clearance are incorporated within the endless circulation path of the ball screw.

Within the endless circulation path of the ball screw, there are incorporated a large number of load balls with a mounting clearance between the load balls.

That is, where a whole block length of the endless circulation path is expressed as L, the diameter of the load ball is expressed as D and the number of the load balls is expressed as n, there is generated a mounting clearance of L−(D×n).

Due to the mounting clearance, especially when the ball screw operates or rotates at a low speed, the load balls are influenced by gravitation depending on the position relationship of the tube. The gravitation does not have a good effect on the operation characteristic (dynamic torque characteristic) of the ball screw.

In case where the low-speed operating tube is disposed so as to face upwardly, the above mounting clearance occurs within the tube. This causes the load balls to rub against each other, so that a clogging phenomenon occurs.

Figure 7:
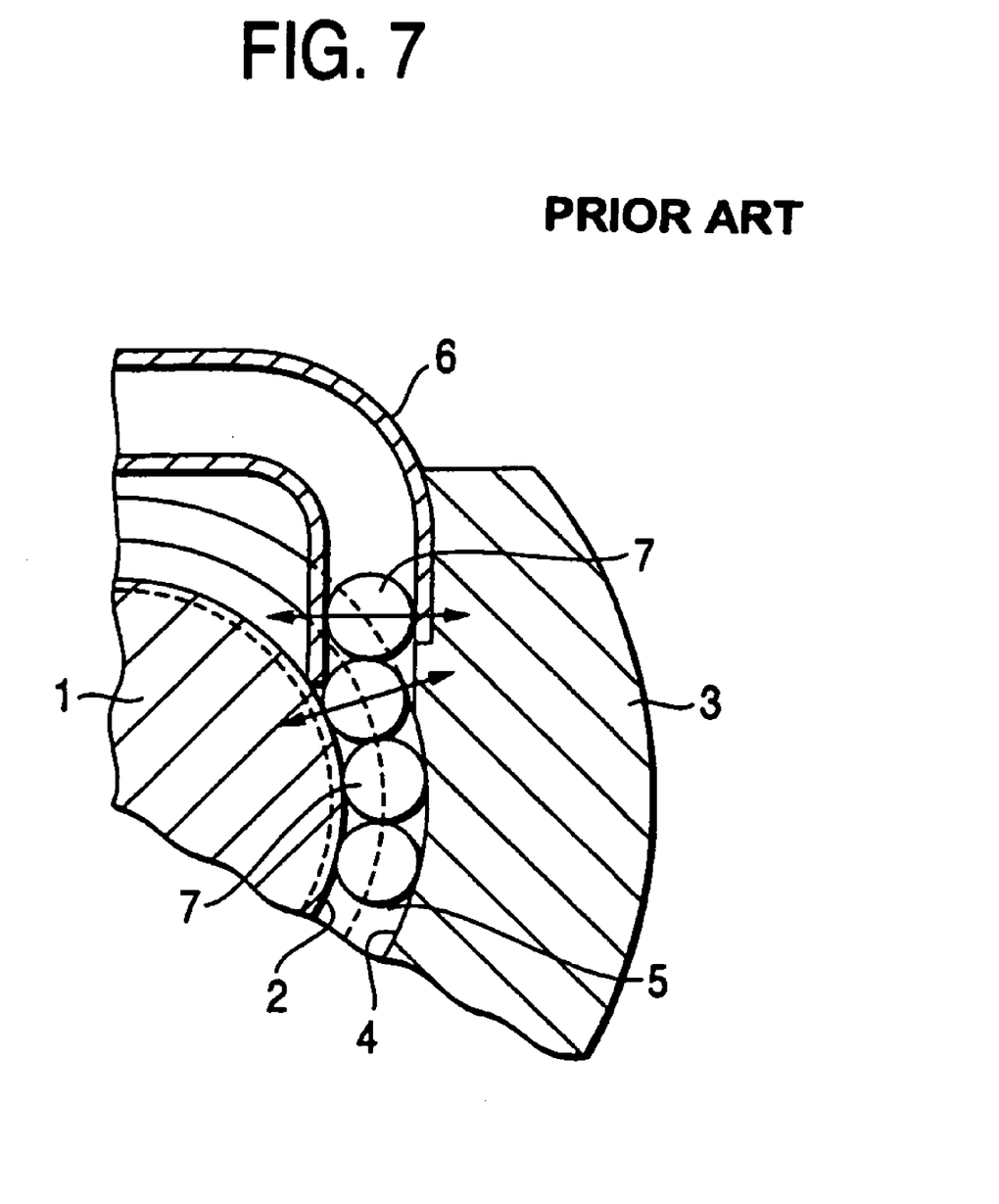
FIG. 7 is a section view of the structure of a portion of a conventional ball screw.

FIG. 7 shows a structure of a connecting portion between a ball rolling path 5 and a tube 6 as a return path. The ball rolling path 5 are formed by both ball rolling groove 2 in a screw shaft 1 and ball rolling groove 4 in a nut 3.

In this structure, a load ball 7 is moved in accordance with a relative helical rotation of the nut 3 with respect to the screw shaft 1 in such a manner that it is scooped up into the tube 6.

The load ball scoop-up portion, in which the ball rolling path 5 and tube 6 are connected together, has a clearance in the diameter direction of the load balls with respect to the diameter of the load ball and thus play between the load ball scoop-up portion and load ball 7 are in a certain degree.

Therefore, when the load balls 7 pass through the load ball scoop-up portion, they are arranged side by side, that is, there occurs a side-by-side arrangement phenomenon.

The side-by-side arrangement varies depending on the position relationship of the tube 6, so that the side-by-side arrangement does not have a good effect on the operation characteristic of the ball screw.

Figure 8A:
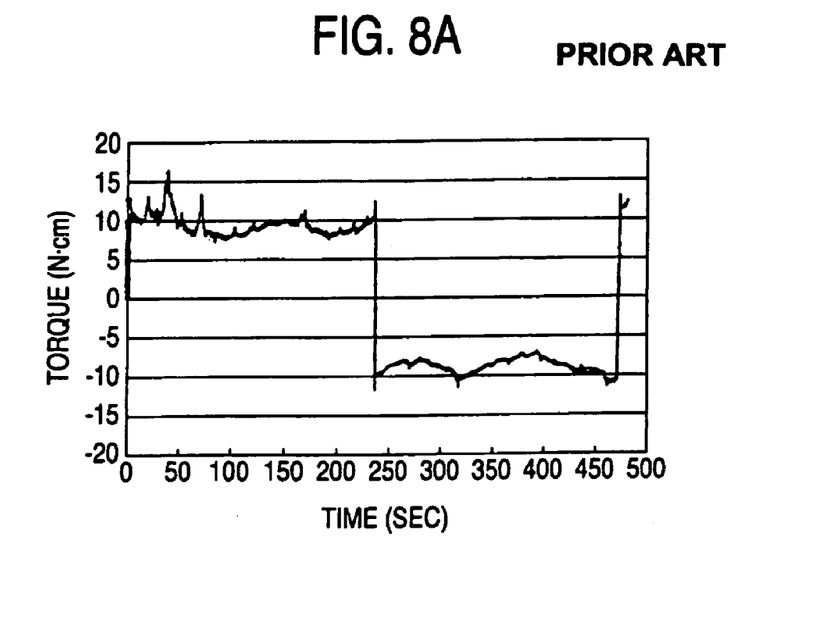
FIG. 8A is a graphical representation of the dynamic torque characteristic of the conventional ball screw when the tube is disposed upwardly of the nut.
Figure 8B:
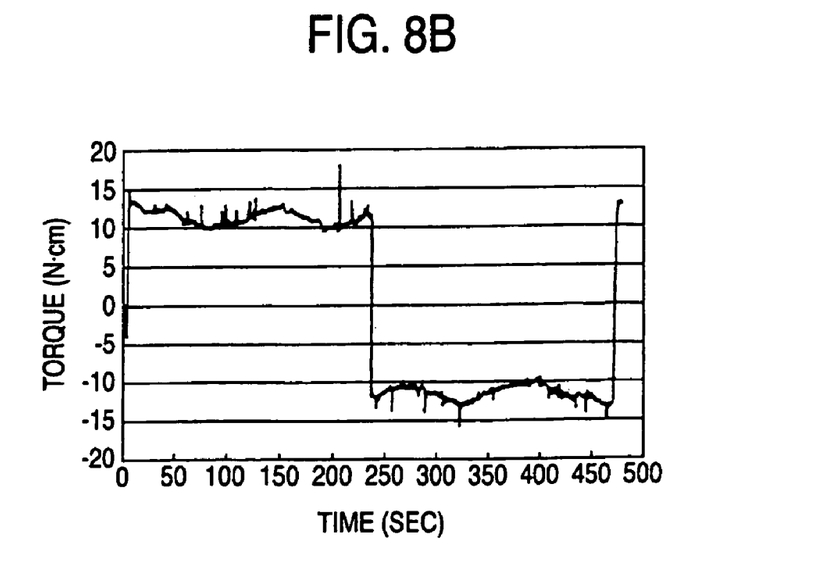
FIG. 8B is a graphical representation of the dynamic torque characteristic of the ball screw when the tube is disposed downwardly of the nut.

FIG. 8A shows a dynamic torque characteristic of a ball screw when the ball screw is installed horizontally and a tube is disposed upwardly of the nut. FIG. 8B shows a dynamic torque characteristic of the ball screw when the tube is disposed downwardly of the nut.

That is, FIG. 8A shows the dynamic torque characteristic of the ball screw when the tube is disposed upwardly of the nut, and FIG. 8B shows the dynamic torque characteristic of the ball screw when the tube is disposed downwardly of the nut.

When the tube is disposed upwardly of the nut, the torque is varied due to the load ball clogging phenomenon.

When the tube is disposed downwardly of the nut, a slight torque variation which is referred to as a so called "mustache".

FIGS. 8(A), (B) respectively show especially the dynamic torque characteristics of the ball screw in the low-speed rotation in which the operation characteristics of the ball screw appears outstandingly as the torque characteristics thereof.

In case where the tube of the ball screw is disposed at a specific position where the tube has no effect on the operation characteristic of the ball screw, there arises almost no problem.

However, for example, when the ball screw is used in such a manner that a screw shaft thereof is fixed and a nut disposed on the outer periphery of the screw shaft is helically rotated with respect to the screw shaft, the position of the tube gradually varies according to the helical rotation of the nut. Accordingly, it is impossible to determine the position of the tube at a specific position.

In case where a ball screw includes a plurality of endless circulation paths and a plurality of tubes, as a return paths which are corresponding to endless circulation paths, and which are disposed on the outer periphery of a nut in a state that tubes are shifted in phase from one another, even when the position of one of the tubes is determined at a specific position, the positions of the remaining tubes are shifted out of the specific position.

Thus, in the case of a ball screw that position of the return path cannot be limited to a single specific position, the position relationship of the tubes cause to an ill influence on the operation characteristic of the ball screw.

Figure 9:
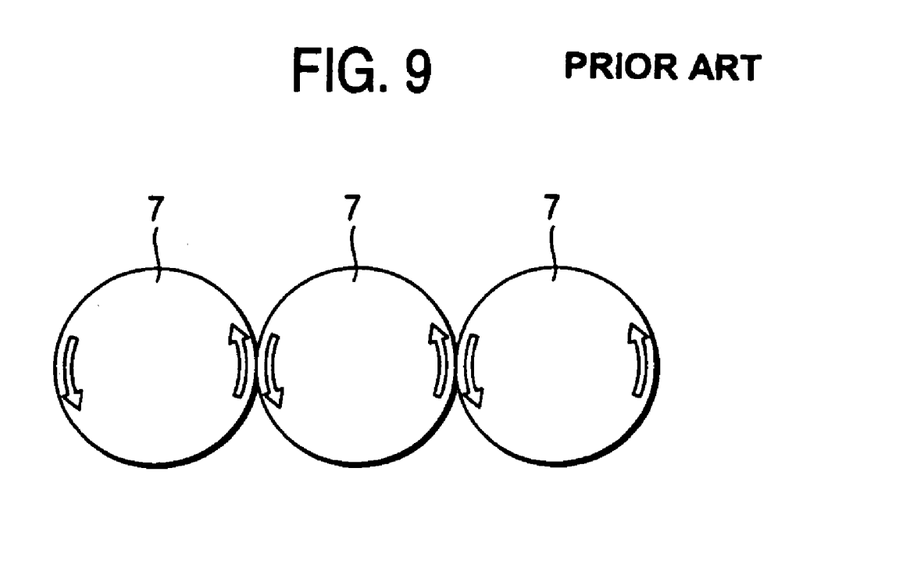
FIG. 9 is a side view of the state of arrangement of load balls used in the conventional ball screw; and, FIG. 10 is a side view of a state in which spacer balls are respectively interposed between mutually adjacent load balls.

The operation characteristic of the ball screw is worsened, since the balls 7 are directly contacted with each other to thereby rub against each other as shown in FIG. 9.

The mutually rubbing state varies according to the position of the tube. The mutually rubbing actions of the load balls 7 cause the load balls 7 to wear and also damage them, that is, the mutually rubbing actions of the load balls 7 have ill influences on the operation characteristic of the ball screw in these respects as well.

The above-mentioned data on the torque characteristic relate to a ball screw which is a pre-loaded product. For example, even in the case of a clearance screw, in a state where a load is applied to the clearance screw, the relationship between the load balls is similar to the pre-loaded products. Therefore, preferably, there may be eliminated the mutually rubbing actions between the load balls.

Figure 10:
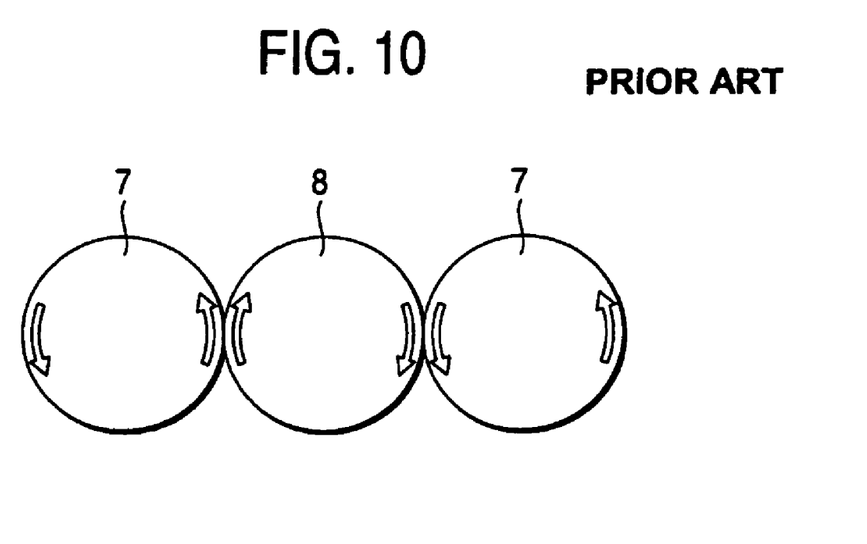

Conventionally, as measures against the worsened operation characteristic of the ball screw, as shown in FIG. 10, a spacer ball 8 having a diameter smaller by several tens of μm than the load ball 7 is inserted between the mutually adjoining load balls 7 to thereby avoid the mutual contact between the load balls 7.

However, in this case, the number of load balls 7, which can be mounted into the endless circulation path, is reduced down to ½ or ⅓. Therefore, the ball screw of this type has disadvantages in the load capacity and rigidity thereof.

SUMMARY OF THE INVENTION

It is an object of the invention to provide a ball screw which can prevent an operation characteristic thereof from being worsened regardless of the position of the return path.

In a first aspect of the invention, a ball screw comprising: a screw shaft having a first helical ball rolling groove in an outer periphery thereof; a nut having a second helical ball rolling groove in an inner periphery thereof; a ball rolling path formed between first and second helical ball rolling grooves; a return path connecting one end of said ball rolling path and the other end of said ball rolling path is provided with said nut; an endless circulation path formed by both said ball rolling path and said return path; and Load balls disposed within said endless circulation path, wherein a position of said return path in said endless circulation path for said ball screw includes two or more positions, and wherein retaining pieces are interposed between said load balls.

In the second aspect of the invention, the return path is a tube made of metal in the ball screw of the invention.

In the third aspect of the invention, the ball screw is a ball screw of a nut rotation type in the ball screw of the invention.

In the forth aspect of the invention, the return path has a plurality of return paths and wherein said plurality of return paths are disposed in a peripheral direction of said outer periphery of said nut in such a manner that they are shifted in phase from each other in the ball screw of the invention.

DESCRIPTION OF THE PREFERRED EMBODIMENTS

Figure 1:
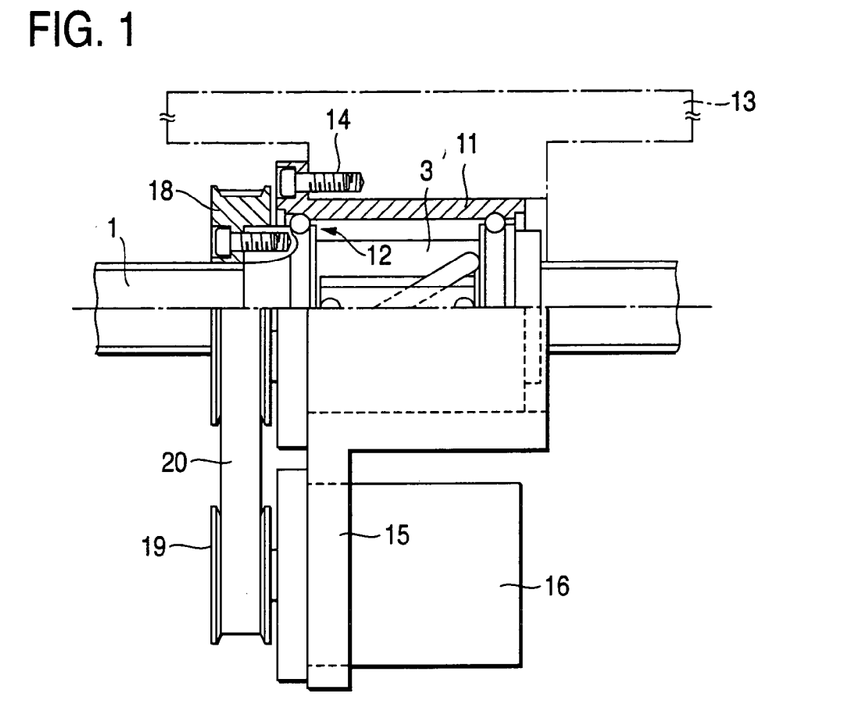
FIG. 1 is a side view of a ball screw according to a first embodiment of the invention.
Figure 2:
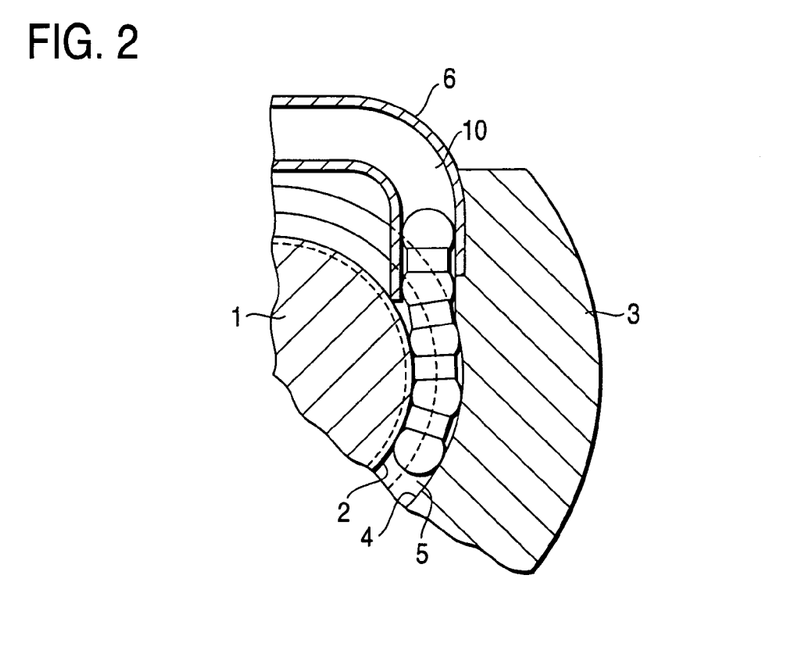
FIG. 2 is a section view of the structure of a portion of the ball screw shown in FIG. 1.
Figure 3:
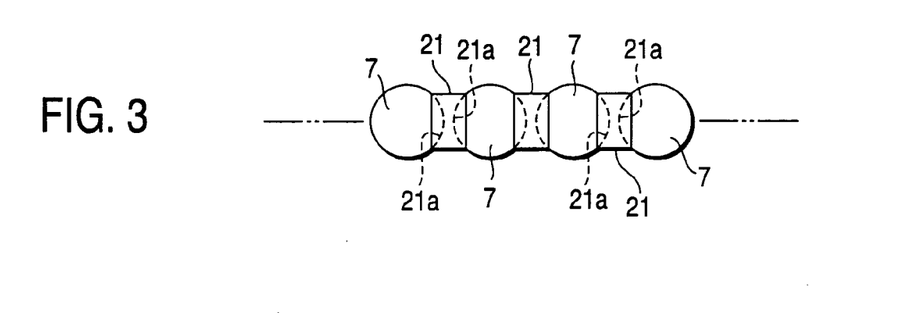
FIG. 3 is a side view of load balls and retaining pieces used in the ball screw shown in FIG. 1.

Now, description will be given below of embodiments of a ball screw according to the invention with reference to FIGS. 1 to 6. FIGS. 1 to 3 show a first embodiment of a ball screw according to the invention. In a ball screw according to the present embodiment, a screw shaft 1 is supported horizontally and fixed. A nut 3 is fitted with an outer periphery of the screw shaft 1.

In the outer peripheral surface of the screw shaft 1 and the inner peripheral surface of the nut 3, as shown in FIG. 2, helical ball rolling grooves 2, 4, which are mutually opposed are formed, while the mutually opposed rolling grooves 2, 4 cooperate together in forming a ball rolling path 5 therebetween.

On the nut 3, there is disposed a metal tube 6 as a return path for connecting one end portion of the ball rolling path 5 to the other end portion thereof, while the tube 6 and ball rolling path 5 cooperate together in forming an endless circulation path 10.

On the outer periphery of the nut 3, there is disposed a cylindrical-shaped housing 11, while the housing 11 is supported on the nut 3 through a bearing 12. The nut may be rotatably with respect to the housing 11. A moving table 13 is mounted on the housing 11 through a screw 14.

A motor 16 as a drive source is mounted on the housing 11 through a bracket 15, while a timing pulley 17 is mounted on the output shaft of the motor 16.

A timing pulley 18 is fixed through a screw 19 to the end portion of the nut 3 on one end side of the nut 3. A timing belt 20 is hooked between the timing pulley 18 and the above-mentioned timing pulley 17.

A large number of load balls 7 are inserted to be arranged in a row into the endless circulation path 10. Retaining pieces 21 are interposed between load balls 7.

Each retaining piece 21 is made of e.g. synthetic resin. As shown in FIG. 3, retaining piece is formed as a disk having an outside diameter smaller than the diameter of the load ball 7. Spherical-shaped recessed portions 21a are formed in the axial-direction two end faces of the retaining piece 21. The partial portions of the surfaces of the load balls 7 disposed on the two sides of each retaining piece 21 are fitted into the recessed portions 21a, so that the retaining pieces 21 are slidably contacted with the load balls 7.

In the ball screw, the power generated by the rotation of the motor 16 is transmitted through the timing belt 20 to the nut 3. The thus transmitted power causes the nut 3 to rotate helically through the rolling motion of the load balls 7, so that the nut 3 is moved in the axial direction of the screw shaft 1.

Both housing 11 rotatably disposed on the outer periphery of the nut 3 and moving table 13 are moved integrally with the nut 3 in the axial direction of the screw shaft 1. That is, the ball screw is a ball screw of a nut rotation type.

When the nut 3 rotates helically, the load balls 7 roll within the ball rolling path 5 and circulate endlessly within the endless circulation path 10.

Due to the helical rotation of the nut 3, the position of the tube 6, which is the return path of the endless circulation path 10, varies gradually.

However, the retaining pieces 21 are respectively inserted between the mutually adjacent load balls 7 disposed within the endless circulation path 10. Therefore, unlike a ball screw of a so called ball-only type in which only the load balls 7 are disposed within the endless circulation path 10 in such a manner that they are contacted with each other, in the ball screw of the embodiments, regardless of variations in the position of the tube 6, the mutual rubbing actions between the load balls 7 as well as the side-by-side arrangement phenomenon in the load ball scoop-up portion of the connecting portion between the ball rolling path 5 and tube 6 can be restricted. Accordingly, a good dynamic torque characteristic may be obtained.

Figure 4A:
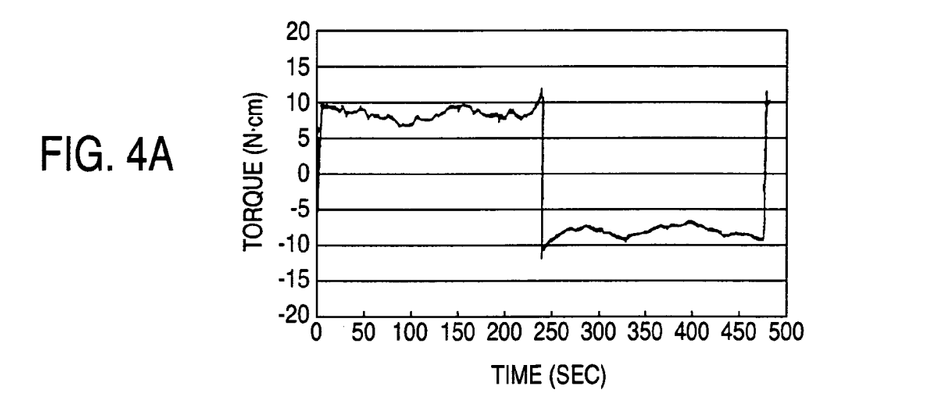
FIG. 4A is a graphical representations of the dynamic torque characteristic of the ball screw shown in FIG. 1 when the tube is disposed upwardly of the nut.
Figure 4B:
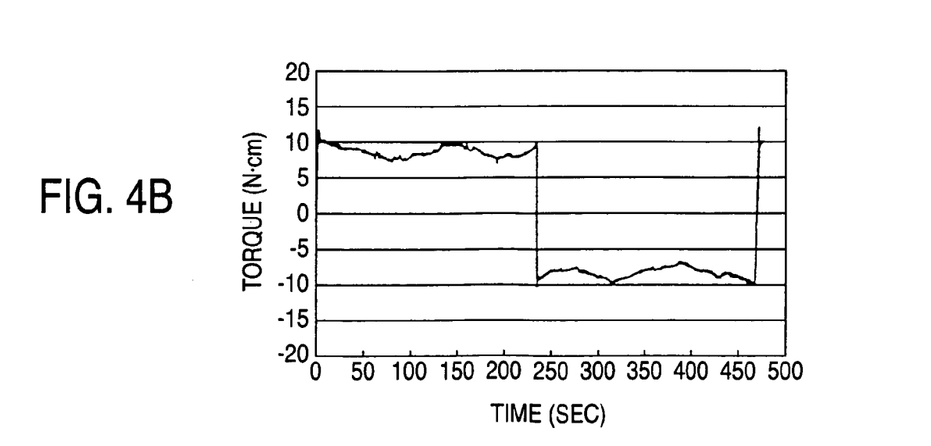
FIG. 4B is a graphical representations of the dynamic torque characteristic of the ball screw shown in FIG. 1 when the tube disposed downwardly of the nut.

FIGS. 4A, 4B show the dynamic torque characteristics of the ball screw according to the present embodiment. FIG. 4A shows the dynamic torque characteristic obtained when the tube 6 is disposed upwardly of the nut 3 FIG. 4B shows the dynamic torque characteristic obtained when the tube 6 is disposed downwardly of the nut 3.

In both cases, variations in the torque are slight and there can be obtained a stable and excellent dynamic torque characteristic.

As described above, each retaining piece 21 to be interposed between the load balls 7 is a member which is substantially formed in a disk. The partial portions of the surfaces of the load balls 7 are fitted into the recessed portions 21a formed in the two end faces of the retaining piece 21.

Therefore, differently from the conventional ball screw in which the spacer balls are inserted between the load balls, a reduction in the number of load balls 7 to be inserted into the endless circulation path 10 is little. Accordingly, the reduction of the load capacity thereof and the lowering of the rigidity may be restricted.

Figure 5:
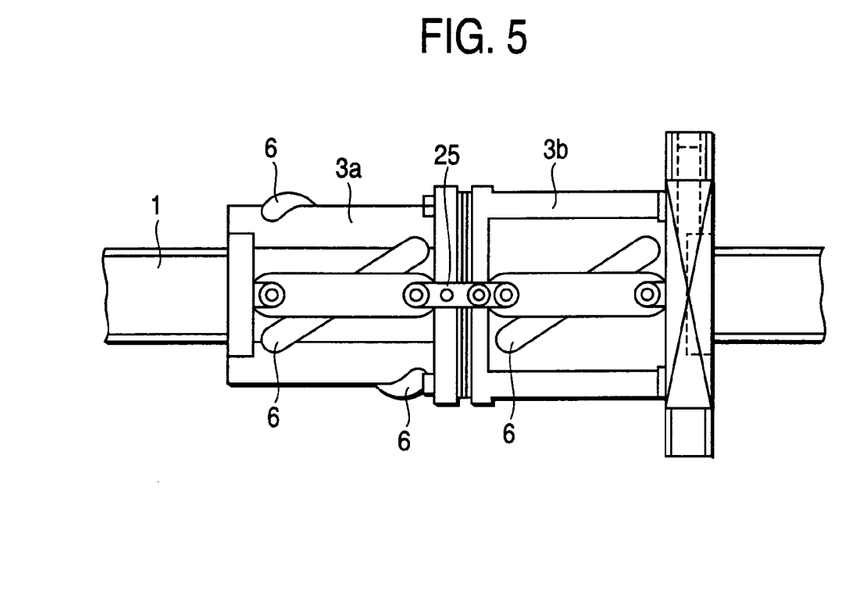
FIG. 5 is a side view of a ball screw according to a second embodiment of the invention.

Now, FIG. 5 shows a second embodiment of a ball screw according to the invention. In the ball screw according to the present embodiment, a pair of nuts 3a, 3b are fitted with a screw shaft 1, while the two nuts 3a, 3b are integrally connected to each other by a connecting member 25 one nut 3a is made of a three-thread screw and the other nuts 3b is made of a two-thread screw in order to secure the load capacity of the ball screw.

Therefore, one nut 3a has three endless circulation paths. Three tubes 6 as the return paths of the three endless circulation paths are disposed in three equivalent portions in the peripheral direction of the outer periphery of the nut 3a in such a manner that they are shifted in phase from each other.

The other nut 3b has two endless circulation paths. Two tubes 6 as the return paths of the two endless circulation paths are disposed in two equivalent portions in the peripheral direction of the outer periphery of the nut 3b in such a manner that they are shifted in phase from each other.

In the respective endless circulation paths, there are disposed a large number of load balls and a large number of retaining pieces respectively interposed between the mutually adjacent ones of the load balls. The ball screw may be used in e.g. a machine tool.

In the thus-structured ball screw, the position of one or two of the tubes 6 can be determined at a single specific position which has no influence on the operation characteristic of the ball screw, whereas the position of the remaining tube 6 cannot be determined at its specific position.

However, since the retaining pieces are respectively interposed between the load balls within the endless circulation paths, regardless of the positions of the tubes 6, variations in the torque can be restricted. Therefore, a stable and excellent dynamic torque characteristic.

Figure 6:
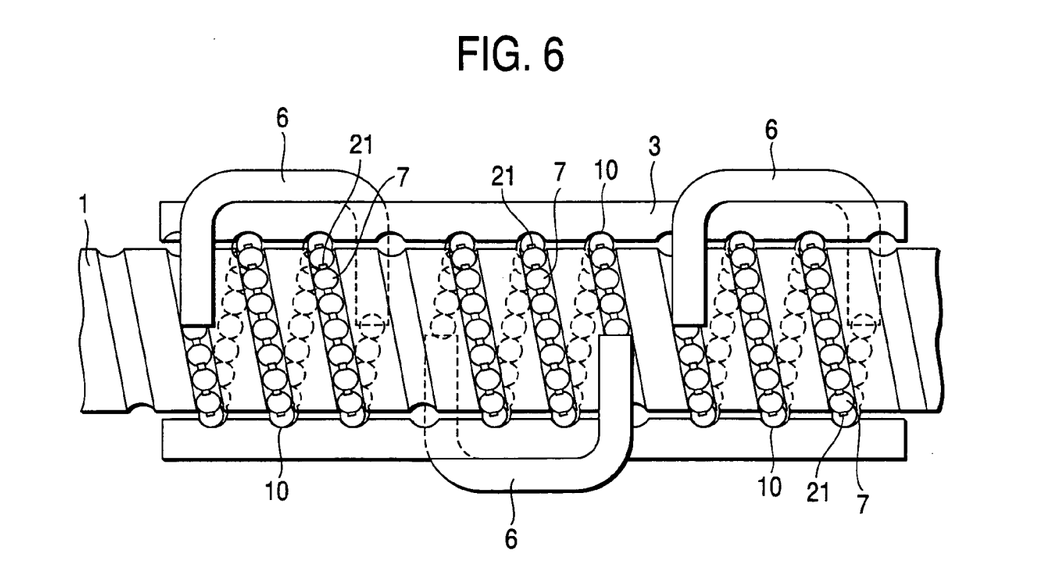
FIG. 6 is a side view of a ball screw according to a third embodiment of the invention.

Now, FIG. 6 shows a third embodiment of a ball screw according to the invention. In the ball screw according to the invention, in order to secure the load balance of a load ball 7, three tubes 6 in the peripheral direction of the outer periphery of the nut 3 are disposed on a nut 3 fitted with the outer periphery of a screw shaft 1. In other words, the tubes are disposed on the upper and lower sides thereof in such a manner that they are shifted in phase from each other.

These three tubes 6 respectively form three independent endless circulation paths. In the respective endless circulation paths, there are disposed a large number of load balls 7 and a large number of retaining pieces 21 respectively interposed between the mutually adjacent ones of the load balls 7. The ball screw may be used in e.g. an injection molding machine.

In the thus-structured ball screw as well, the position(s) of one or two of the tubes 6 can be determined at a single specific position which has no influence on the operation characteristic of the ball screw, whereas the position(s) of the remaining tube(s) 6 cannot be determined at its specific position. However, since the retaining pieces are respectively interposed between the load balls within the endless circulation paths, similarly to the previously described first embodiment, regardless of the positions of the tubes 6, variations in the torque can be restricted, thereby being able to obtain a stable and excellent dynamic torque characteristic.

As has been described heretofore, according to the invention, even in case where the position of the return path of the endless circulation path cannot be determined at a single specific position, regardless of the position of the return path thereof, variations in the torque can be restricted, thereby being able to obtain a stable and excellent dynamic torque characteristic.

What is claimed is:

1. A ball screw comprising:
   a screw shaft having a first helical ball rolling groove in an outer periphery thereof;
   a nut having a second helical ball rolling groove in an inner periphery thereof;
   a ball rolling path formed between first and second helical ball rolling grooves;
   a return path connecting one end of said ball rolling path and the other end of said ball rolling path, said return path formed in said nut;
   an endless circulation path formed by both said ball rolling path and said return path; and
   load balls disposed within said endless circulation path, wherein a position of said return path in said endless circulation path for said ball screw includes two or more positions, and wherein retaining pieces are interposed between said load balls; and
   wherein said return path is a tubular tube made of metal;

wherein said ball screw is configured so that said nut rotates;

wherein said return path has a plurality of return paths and wherein said plurality of return paths are disposed in a peripheral direction of said outer periphery of said nut in such a manner that they are shifted in phase from each other.

2. The ball screw according to claim 1, wherein said retaining piece is made of synthetic resin.

3. The ball screw according to claim 1, wherein said retaining piece is substantially formed in a disk.

4. The ball screw according to claim 3, wherein said retaining piece has an outside diameter smaller than the diameter of the load ball.

5. The ball screw according to claim 4, wherein said retaining piece has a spherical-shaped recessed portion on two end faces of said retaining piece in an axial direction of said retaining piece, and wherein partial surfaces of said load balls disposed on said two sides of said retaining piece are fitted into said spherical-shaped recessed portions, so that said retaining pieces are slidably contacted with said load balls.

* * * * *